US00RE50364E

(19) United States
(12) Reissued Patent
de Boer et al.

(10) Patent Number: US RE50,364 E
(45) Date of Reissued Patent: Apr. 8, 2025

(54) APPARATUS AND METHOD FOR DISPENSING SOLID SUBSTANCES

(71) Applicant: VMI Holland B.V., Epe (NL)

(72) Inventors: Ton de Boer, Epe (NL); Gerrit Jan Scholten, Epe (NL); Kees Jochemsen, Epe (NL); Pieter Cornelis Meijers, Epe (NL)

(73) Assignee: VMI Holland B.V., Epe (NL)

(21) Appl. No.: 17/499,914

(22) Filed: Oct. 13, 2021

Related U.S. Patent Documents

Reissue of:
(64) Patent No.: 10,457,427
Issued: Oct. 29, 2019
Appl. No.: 16/095,490
PCT Filed: Mar. 30, 2017
PCT No.: PCT/NL2017/050195
§ 371 (c)(1),
(2) Date: Oct. 22, 2018
PCT Pub. No.: WO2017/183960
PCT Pub. Date: Oct. 26, 2017

U.S. Applications:
(62) Division of application No. 17/495,910, filed on Oct. 7, 2021, now abandoned, which is an application for the reissue of Pat. No. 10,457,427.

(30) Foreign Application Priority Data

Apr. 22, 2016 (NL) ..... 2016663

(51) Int. Cl.
*B65B 5/10* (2006.01)
*B08B 5/04* (2006.01)
(Continued)

(52) U.S. Cl.
CPC ..... *B65B 5/103* (2013.01); *B08B 5/04* (2013.01); *B65B 9/045* (2013.01); *B65B 35/02* (2013.01);
(Continued)

(58) Field of Classification Search
CPC ..... B65B 5/103; B65B 9/045; B65B 35/02; B65B 35/12; B65B 39/007; B08B 5/04;
(Continued)

(56) References Cited

U.S. PATENT DOCUMENTS 3,318,486 A * 5/1967 Felix ..... B65D 88/30 410/43
3,378,124 A * 4/1968 Martin ..... B65G 69/186 193/2 R
(Continued)

FOREIGN PATENT DOCUMENTS

CA 2754274 A1 3/2013
CN 1253347 A 5/2000
(Continued)

OTHER PUBLICATIONS

Netherlands Search Report from NL Application No. 2016663, dated Dec. 20, 2016.
(Continued)

*Primary Examiner* — William E Dondero
(74) *Attorney, Agent, or Firm* — N.V. Nederlandsch Octrooibureau

(57) ABSTRACT

The invention relates to an apparatus and a method for dispensing solid substances, wherein the apparatus comprises a feeder section with a plurality of feeder units, a collection section with a plurality of hoppers and a dispensing section, wherein the plurality of hoppers are rotatable with respect to the feeder units and a first packing position for dispensing the solid substances to the dispensing section, wherein the apparatus comprises a cleaning device for removing pollutants from the hoppers, wherein the cleaning device comprises a hub and a plurality of ducts forming air connections between the plurality of hoppers and the hub, wherein the cleaning device comprises a first blocking member that is arranged for blocking the air connection
(Continued)

Amended between one of the hoppers and the hub when said one hopper is positioned in the first packing position.

48 Claims, 6 Drawing Sheets

(51) Int. Cl.

| | |
|---|---|
| ***B65B 9/04*** | (2006.01) |
| ***B65B 35/02*** | (2006.01) |
| ***B65B 35/12*** | (2006.01) |
| ***B65B 59/04*** | (2006.01) |
| ***B65G 11/20*** | (2006.01) |

(52) U.S. Cl.
CPC ..... *B65B 35/12* (2013.01); *B65B 59/04* (2013.01); *B65G 11/206* (2013.01); *B65B 2210/08* (2013.01)

(58) Field of Classification Search
CPC ... B65G 11/166; B65G 11/186; B65G 11/206; B65D 88/26; B65D 88/30; B65D 88/32
See application file for complete search history.

(56) References Cited

U.S. PATENT DOCUMENTS 7,818,947 B2 10/2010 Kim
2001/0019065 A1* 9/2001 William ..... G07F 11/165 221/109
2003/0038143 A1* 2/2003 Hashimoto ..... B65B 5/103 221/258
2006/0259195 A1* 11/2006 Eliuk ..... A61J 1/20 700/245
2008/0053785 A1* 3/2008 Neville ..... B65G 11/166 193/25 R
2008/0259721 A1* 10/2008 Nieves-Vazquez .... B65D 88/64 366/152.2
2013/0318931 A1* 12/2013 Holmes ..... B65B 9/02 53/562

FOREIGN PATENT DOCUMENTS

JP 2000203501 A 7/2000
JP 2009067438 A 4/2009
WO 2014081286 A1 5/2014

OTHER PUBLICATIONS

International Search Report from PCT Application No. PCT/NL2017/050195, dated May 22, 2017.

* cited by examiner

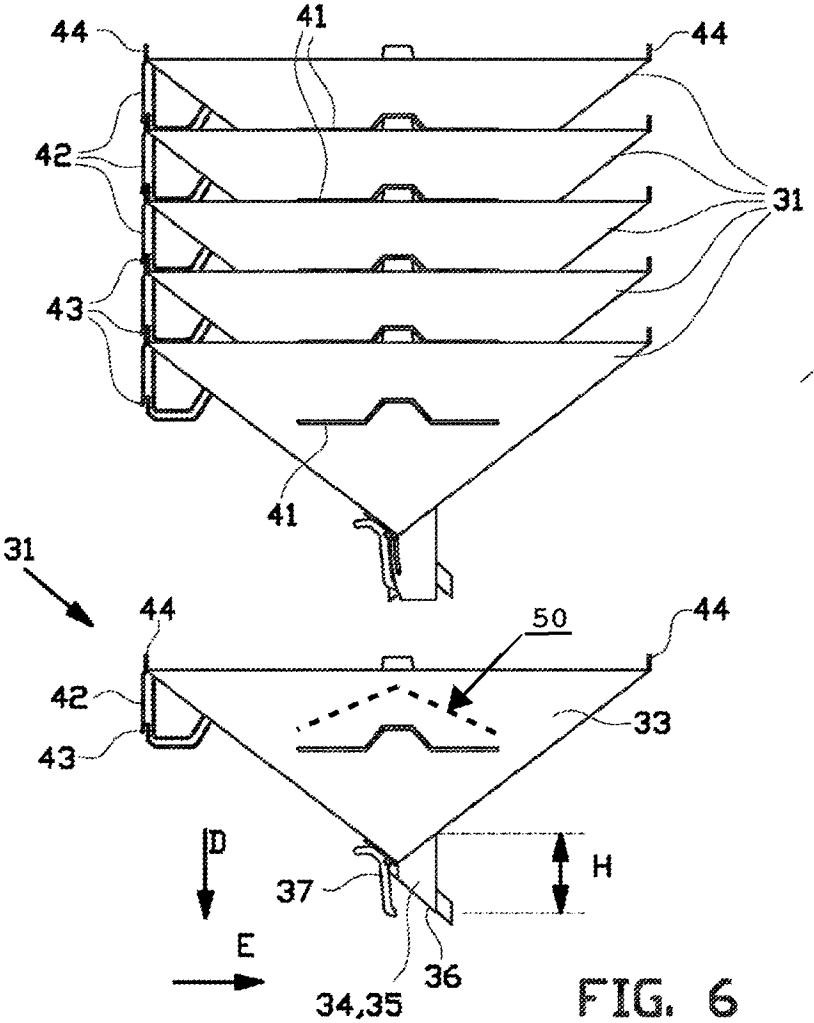
FIG. 6
Amended

APPARATUS AND METHOD FOR DISPENSING SOLID SUBSTANCES

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*This application is a divisional reissue of application Ser. No. 17/495,910 and is also a reissue of U.S. Pat. No. 10,457,427.*

BACKGROUND

The invention relates to an apparatus and method for dispensing solid substances, in particular pills, tablets or capsules, in particular for medical use.

WO 2014/081286 A1 discloses a device for dispensing and packing solid substances comprising a series of feeder units arranged for selectively discharging an amount of solid substances from one or more feeder units for packing. Said device comprises a holding device provided with an array of feeder positions arranged adjacently in a plane, a collection frame arranged below the holding device comprising a series of collection trays for capturing discharged solid substances from said feeder units and each collection tray comprises an output opening, and a packing unit arranged below the collection frame for collecting the captured solid substances from the output opening of a tray and packing said solid substances. The collection frame and the holding device are movable with respect to each other. The solid substances generate pollutants, such as dust, in the collection trays. Pollutants from a previous discharge of solid substances may contaminate the next discharge of solid substances and can be hazardous for the operator of the device.

WO 2014/081286 A1 suggests to provide the collection frame and/or the packing unit with a vacuum device in order to prevent the accumulation inside the trays and/or packing unit, yet remains silent about the technical implementation of such a vacuum device.

U.S. Pat. No. 7,818,947 B2 discloses an automatic medicine packing machine with a plurality of cassettes arranged in an upper portion of a body to receive medicines in various sizes and shapes and a hopper assembly arranged in a lower portion of the body to collect medicines discharged from the cassettes. The hopper assembly consists of an upper hopper and a lower hopper that is movably coupled to the upper hopper. The medicine packing machine further comprises a hopper cleaning device with a vacuum pump and a connection pipe for connecting the vacuum pump to the lower hopper for sucking dust generated from the hopper assembly during the medicine packaging process. The lower hopper is provided with a suction hole formed in a sidewall thereof to suck dust and a suction chamber formed around the suction hole. A mesh member is provided in the suction chamber to allow dust to pass there through.

The hopper cleaning device may effectively suck dust from the hopper assembly. However, the suction influences the falling trajectory of the medicines through the hopper. In particular very light-weight medicines, which weigh only a few milligrams, are sucked towards the meshing and occasionally even retained to said meshing. The retained medicines are eventually dispensed from the hopper with a subsequent dose of medicines, which is potentially life-threatening for the patient.

It is an object of the present invention to provide an apparatus and method for dispensing solid substances, wherein one or more of the aforementioned drawbacks can be reduced.

SUMMARY OF THE INVENTION

According to a first aspect, the invention provides an apparatus for dispensing solid substances, wherein the apparatus comprises a feeder section with a first holder for holding a plurality of feeder units in a first circular array that extends concentrically around an upright central axis, a collection section with a second holder for holding a plurality of hoppers in a second circular array that extends concentrically around the central axis below the first holder, and a dispensing section below the second holder, wherein the second holder is rotatable about the central axis for rotating the plurality of hoppers with respect to the feeder positions for receiving solid substances from one or more of the feeder units and with respect to a first packing position for dispensing the solid substances to the dispensing section, wherein the apparatus further comprises a cleaning device for removing pollutants from the plurality of hoppers, wherein the cleaning device comprises a hub that is rotatable about the central axis together with the second holder and a plurality of ducts for forming an air connection between each of the plurality of hoppers and the hub, wherein the hub is arranged to be connected to a vacuum source for generating a partial vacuum in the hub, wherein the cleaning device comprises a first blocking member that is arranged for at least partially blocking the air connection between one of the hoppers and the hub when said one hopper is positioned in the first packing position.

The partial vacuum in the hub draws air from the hoppers via the respective ducts. The suction may unintentionally retains solid substances, in particular very light-weight solid substances, that should be dispensed to the dispensing section. The retained solid substances may contaminate subsequent dispensing of solid substances, which is potentially hazardous, in particular in case of solid substances for medical use. At least partially blocking the air connection may reduce the partial vacuum and/or restore the normal or atmospheric pressure in the hopper so that the unintentionally retained solid substances are dispensed correctly.

In an embodiment the first blocking member is arranged for at least partially blocking the one duct that forms the air connection between the one hopper and the hub. Blocking the one duct can be an effective way to at least partially block the air connection.

In an embodiment the hub comprises a circumferential wall extending concentrically around the central axis, wherein the ducts debouch into the hub via a plurality of air openings in the circumferential wall, wherein the first blocking member is arranged for at least partially blocking the one duct at the air opening of said one duct in the circumferential wall. Hence, the blocking may occur centrally, at or near the connection of the ducts to the hub.

In a preferred embodiment thereof the air openings are distributed over the circumferential wall of the hub about the central axis.

In a further embodiment thereof the plurality of air openings comprises a first group of air openings and a second group of air openings extending below the first group of air openings in a direction parallel to the central axis, wherein the ducts alternately debouch into the hub via one of the air openings of the first group and one of the air openings of the second group. By alternating the ducts between the first group and the second group, more ducts can be fitted to the duct.

In a further embodiment thereof the first blocking member is located in a first blocking position that is fixed relative to the first packing position. The first blocking position can thus be associated with the first packing position irrespective of the rotation of the second holder.

In an embodiment thereof the first blocking position is radially aligned with the first packing position with respect to the central axis. Thus, blocking a duct at the first blocking position can block the air connection of a hopper that is radially aligned with said first blocking position in the first packing position. Consequently, the ducts can be made to extend radially or substantially radially, i.e. over the shortest distance from the first blocking position to the hopper.

In a further embodiment the first blocking member comprises a blocking body that is arranged to extend at least partially in front of the air opening of the one duct in the circumferential wall. The blocking body can effectively block and/or seal the air opening in the circumferential wall.

In an embodiment thereof the blocking body comprises a blocking surface that extends concentrically with respect to the circumferential wall along a circular arc with an arc length that is arranged to cover the air opening of at least the one duct. Thus, the blocking surface can effectively block and/or seal the air opening in the circumferential wall within its arc length.

In an embodiment thereof the second holder is arranged to be rotated about the central axis in a rotational direction, wherein the arc length is arranged to cover the air opening of the one duct and the air opening of a duct that connects to an adjacent hopper directly upstream or downstream in the rotational direction of the one hopper. Preferably, the arc length is arranged to cover the air openings of two ducts that connect to two adjacent hoppers directly upstream or downstream in the rotational direction of the one hopper. It can be advantageous to already block the air openings associated with one or more hoppers upstream of the one hopper to ensure that any solid substances stuck in the hopper are already detached and/or have fallen further down the hopper prior to said one or more hoppers reaching the first packing position. Blocking an air opening associated with one or more hoppers downstream of the one hopper may prevent that the partial vacuum is restored too early, for example while the hopper is still closing shortly after dispensing.

In a further embodiment thereof the blocking surface is arranged to abut the circumferential wall, wherein the circumferential wall is arranged to slide along the blocking surface when hub rotates together with the second holder about the central axis. The abutting and/or sliding contact can prevent air leaking past the blocking surface.

In a more elaborate embodiment the dispensing section comprises a second packing position, wherein the cleaning device comprises a second blocking member that is arranged for at least partially blocking the air connection between one of the hoppers and the hub when said one hopper is positioned in the second packing position. The second packing position can be used to increase the output of the apparatus, as two doses of dispensed solid substances can be packed simultaneously. The second blocking member can block the air connection to a hopper in said second packing position to prevent the solid substances in said hopper from being retained during dispensing.

In an even more elaborate embodiment the dispensing section comprises a waste position, wherein the cleaning device comprises a third blocking member that is arranged for at least partially blocking the air connection between one of the hoppers and the hub when said one hopper is positioned in the waste position. The waste position can be used to clear out the contents of the hoppers. The cleaning device can block the air connection to a hopper in said waste position to prevent waste from being retained inside the hopper.

In a further embodiment thereof the blocking members are spaced apart about the central axis sufficiently so as to allow each duct to form an unblocked air connection with the hub in the spacing between the blocking members. Thus, air can be drawn from the hoppers for ducts that are in between blocking members, to ensure that pollutants can be removed from such hoppers when the hoppers move from one position to the other.

In an embodiment the cleaning device further comprises a discharge conduit that is fixed relative to the central axis and a coupling for forming an air connection between the fixed discharge conduit and the rotatable hub, wherein the discharge conduit is arranged for discharging air from the hub. The coupling can facilitate a transfer of the collected air from the rotating hub to the fixed discharge conduit.

In an embodiment the apparatus further comprises a control section with a control unit for controlling the operation of the apparatus, wherein the discharge conduit is connected to the control section for cooling the control unit with the discharged air from the discharge conduit. Hence, the collected air can be used effectively in other parts of the apparatus.

In an embodiment thereof the cleaning device comprises a filter in the discharge conduit for filtering the pollutants from the discharged air. The filter can prevent the pollutants from being discharged together with the discharged air.

In an embodiment the air connections are airtight or substantially airtight. The air-tight connections can prevent the pollutants from escaping to the environment uncontrollably.

In an embodiment the feeder section comprises a housing and an air inlet in the housing, wherein the housing is airtight or substantially airtight apart from the air inlet, wherein the ducts are in fluid or air communication with the housing via the plurality of hoppers, wherein the cleaning device is arranged for drawing air into the housing via the air inlet.

In an embodiment thereof the apparatus comprises a filter in the air inlet for filtering the drawn air. The incoming air flow can thus be filter to ensure that filtered air is drawn into the apparatus.

In an embodiment thereof the air inlet is placed in fluid or air communication with the feeder section. The air can thus be drawn into the hoppers via the feeder section. Thus, the cleaning device not only sucks dust from the hoppers, but to an extent can also suck dust from the feeder section.

In an embodiment each hopper comprises a hopper inlet for receiving the solid substances from one or more of the feeder units and a hopper outlet for dispensing the solid substances to the dispensing section in a downward dispensing direction, wherein the hopper inlet tapers towards and debouches into the hopper outlet, wherein each of the ducts is connected to a respective one of the hoppers at said hopper outlet in a suction direction transverse or perpendicular to the dispensing direction. Hence, dust can be sucked out the hopper outlet transversely while the solid substances are allowed to continue in the downward dispensing direction, thereby ensuring a good separation of dust from the solid substances.

In an embodiment thereof the hopper outlet comprises an outlet channel extending over an outlet height in the dispensing direction and terminating with an outlet opening at the distal end thereof, wherein the each of the ducts is connected to the outlet channel of a respective one of the hoppers at a distance spaced apart from the outlet opening. Thus, the suction does not influence solid substances downstream of the ducts towards the outlet openings and vice versa. Hence, a certain amount of solid substances can be buffered at the outlet opening without blocking the duct.

In a practical embodiment thereof each hopper or each duct is provided with a grating that extends between the duct and the respective hopper for allowing air communication between the hopper and the duct while blocking solid substances from entering the duct.

In a further embodiment thereof each hopper comprises a dispensing valve that is movable between an open position and a closed position for opening and closing the hopper outlet, respectively, wherein the first blocking member is arranged for at least partially blocking the air connection between the hopper and the hub when the dispensing valve of the hopper is open. Thus, it can be prevented that suction is applied to the hopper, at least while the hopper is dispensing.

According to a second aspect, the invention provides a method for dispensing solid substances with the use of the aforementioned apparatus, wherein the method comprises the steps of removing pollutants from the plurality of hoppers with the use of the partial vacuum provided by the cleaning device and using the first blocking member to at least partially block the air connection between one of the hoppers and the hub when said one hopper is positioned in the first packing position.

One skilled in the art will appreciate that the steps of the method directly relate to the features of aforementioned apparatus and, as such, have the same advantageous effects. These effects will not be repeated hereafter for reasons of conciseness.

In an embodiment of the method the dispensing section comprises a second packing position, wherein the method further comprises the step of using a second blocking member to at least partially block the air connection between one of the hoppers and the hub when said one hopper is positioned in the second packing position.

In a further embodiment of the method the dispensing section comprises a waste position, wherein the method further comprises the step of using a third blocking member to at least partially block the air connection between one of the hoppers and the hub when said one hopper is positioned in the waste position.

In a preferred embodiment of the method the apparatus comprises a control section with one or more control units, wherein the method further comprises the step of discharging air with the pollutants from the hub, filtering the pollutants from the air and using said filtered air to cool the one or more control units.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached schematic drawings, in which:

FIG. 6 shows a plurality of the hoppers in a stacked configuration for storage or cleaning purposes.

DETAILED DESCRIPTION OF THE INVENTION

Figure 1:
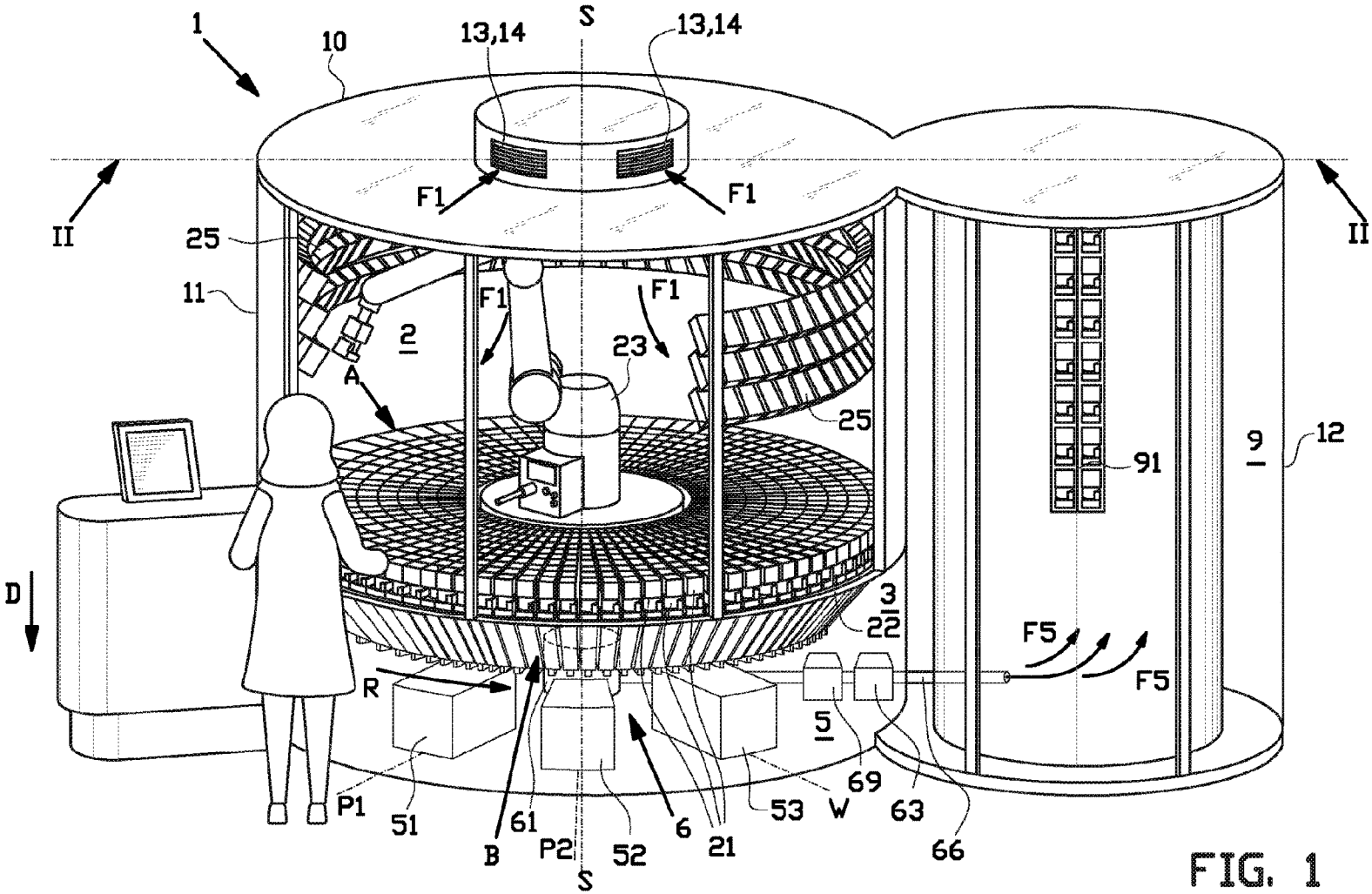
FIG. 1 shows an apparatus for dispensing solid substances according to an exemplary embodiment of the invention, comprising a feeder section with a plurality of feeder units, a collection section with a plurality of hoppers and a dispensing section with two packing units and a waste unit.
Figure 2:
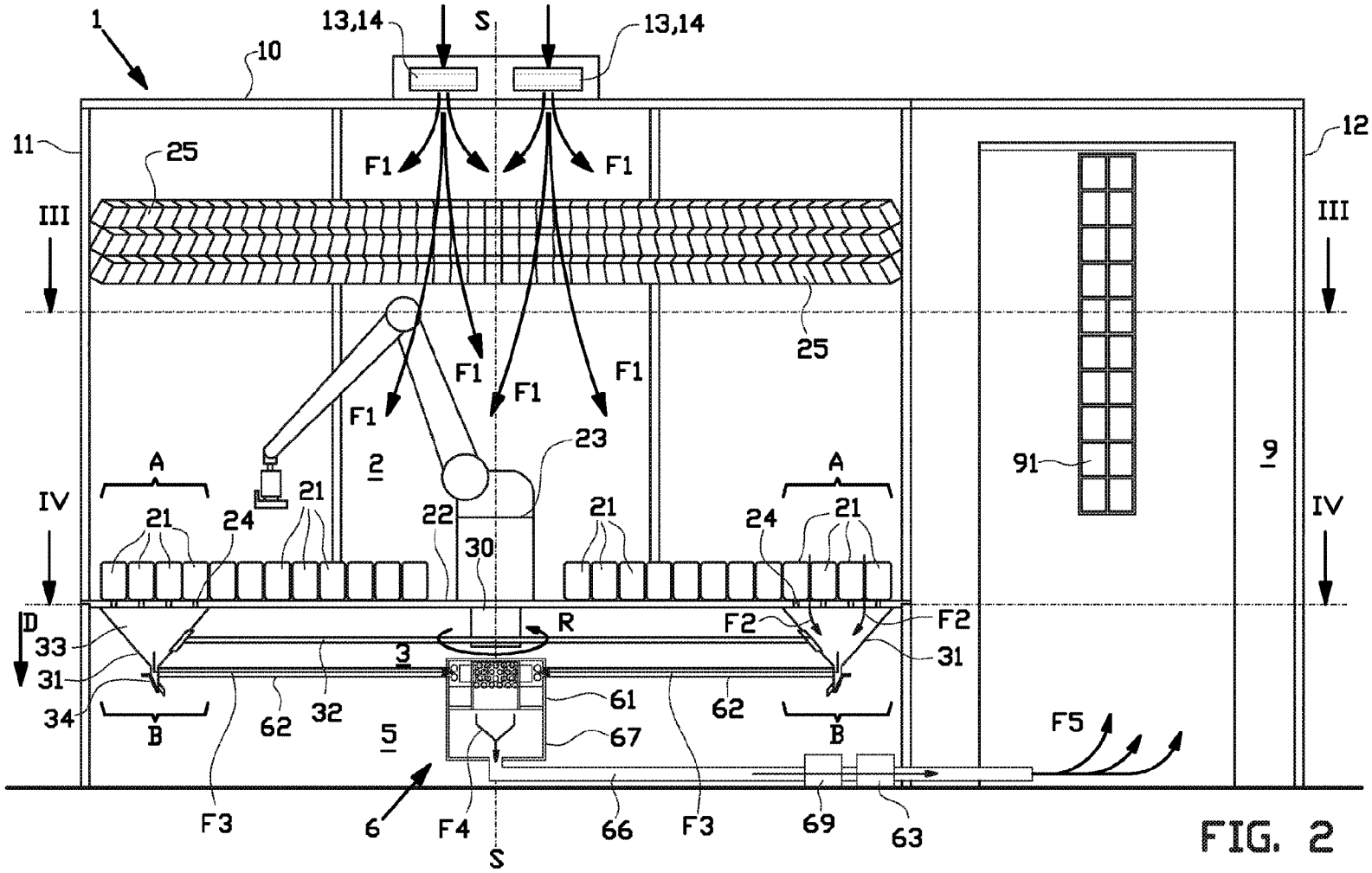
FIG. 2 shows a vertical cross section through all of the aforementioned sections of the apparatus according to the line II-II in FIG. 1.

FIGS. 1 and 2 show an apparatus 1 for dispensing solid substances, in particular pills, tablets or capsules, more in particular medicines for medical use. The apparatus 1 is preferably arranged for dispensing and/or dosing a selection of medical substances which corresponds to a daily dose carefully customized for a specific patients' needs. The general operation of such an apparatus 1 is described in detail in WO 2014/081286 A1, which is hereby incorporated by reference.

The apparatus 1 comprises a housing 10 with a feeder section 2, a collection section 3 and a dispensing section 5. The feeder section 2 comprises a plurality of feeder units 21 which are arranged for receiving and selectively feeding an amount of the solid substances to the collection section 3. The collection section 3 comprises a plurality of trays or hoppers 31 for collecting the selectively dispensed solid substances from one or more feeder units 21 and for subsequently dispensing said collected solid substances to the dispensing section 5 for further handling. The dispensing section 5 comprises a first packing unit 51 and a second packing unit 52 in a first packing position P1 and a second packing position P2, respectively, for packing the dispensed solid substances in appropriate packaging, e.g. a sealed plastic bag, a plastic container or the like. The dispensing section 5 further comprises a waste unit 53 in a waste position W for clearing out the contents of the hoppers 31 in case of a malfunction in the system and/or for cleaning purposes.

Figure 3:
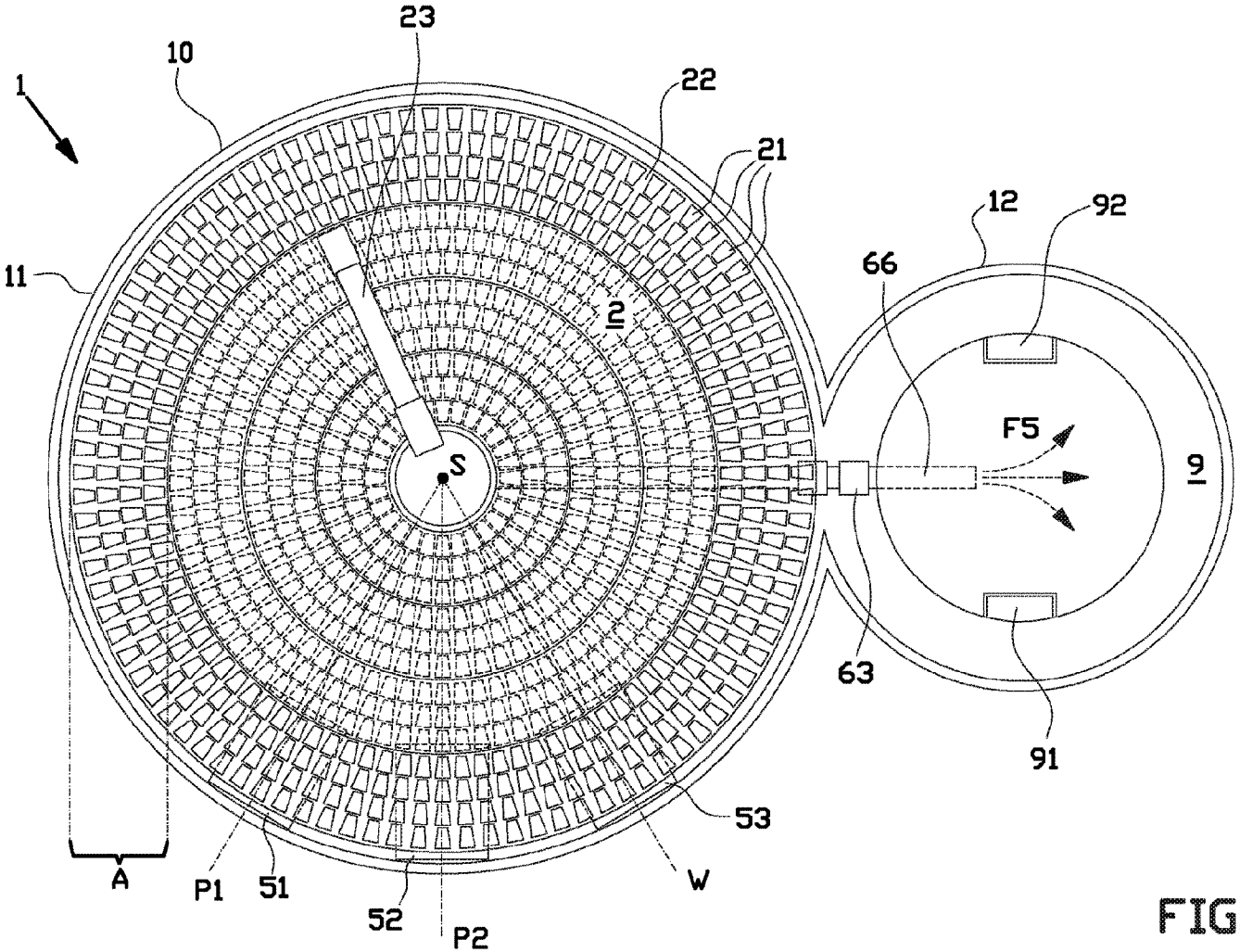
FIG. 3 shows a horizontal cross section of the apparatus at the feeder section according to the line III-III in FIG. 2.

As shown in FIGS. 1, 2 and 3, the feeder section 2 comprises a first frame or holder 22 for holding a selection of the plurality of feeder units 21 in a plurality of feeder positions that form a first circular array A above the hoppers 31 of the collection section 3. The first circular array A extends in a horizontal or substantially horizontal plane, concentrically around an upright, vertical or substantially vertical central axis S. The feeder section 2 is further provided with a storage rack 25 with a plurality of storage positions for temporarily storing unused feeder units 21. In this example, the storage rack 25 is located above the first holder 22. The feeder section 2 comprises a manipulator 23, preferably a robot, that is arranged for picking-up, placing and/or interchanging feeder units 21 between the feeder positions of the first circular array A and the storage positions.

As shown in FIGS. 1 and 2, the feeder units 21 are arranged on the first holder 22 in adjacent, increasingly wider rings of feeder positions. The feeder positions in the adjacent rings are radially aligned with respect to the central axis S. The first circular array A is formed by the feeder positions that are located in the outer rings, in this example the outer four rings of feeder positions. As best seen in FIG. 2, the first holder 22 is provided with feeding holes 24 only at those outer four rings of feeder positions. Hence, only the feeder units 21 in those outer feeder positions can feed solid substances through the feeding holes 24 into the hoppers 31 below. The area of the first holder 22 inside the first circular array A can be used as additional storage positions for unused feeder units 21.

Figure 4:
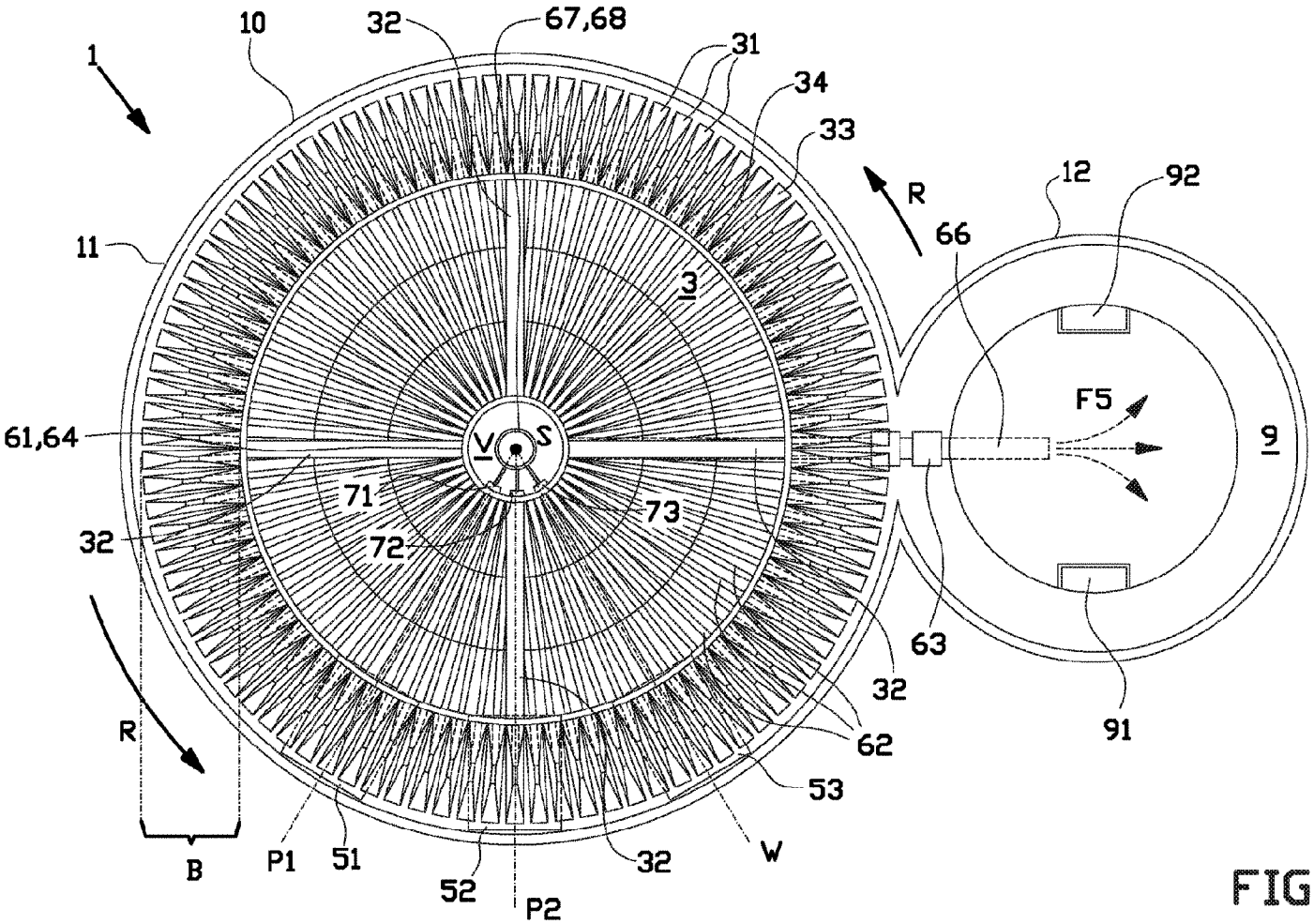
FIG. 4 shows a horizontal cross section of the apparatus at the collection section according to the line IV-IV in FIG. 2.

As shown in FIGS. 1 and 2, the collection section 3 is located below the feeder section 2 in a direction parallel to the central axis S. In particular, the collection section 3 starts below the first holder 22. As best seen in FIG. 4, the collection section 3 comprises a second frame or holder 32 for holding the plurality of hoppers 31 in a plurality of holder positions that form a second circular array B. The second circular array B extends in a horizontal or substantially horizontal plane, concentrically around the central axis S. As such, the second circular array B extends concentrically to and is located below the first circular array A. As shown in FIG. 2, the second holder 32 is rotatable by a drive 30 with respect to the first holder 22 about the central axis S in a direction of rotation R. During rotation in said direction of rotation R, the hoppers 31 in the respective hopper positions on the second holder 32 are rotated underneath the feeder units 31 along the feeder positions. The rotation of the second holder 32 is controlled so that the hoppers 31 are positionable directly underneath any of the feeder positions for receiving solid substances from one or more of the feeder units 31 in the respective feeder positions under the influence of gravity.

As best seen in FIG. 2, each hopper 31 comprises a hopper inlet 33 for receiving the solid substances from one or more of the feeder units 21 and a hopper outlet 34 for dispensing the solid substances to the dispensing section 5 in a downward dispensing direction D. The hopper inlet 33 has a wide opening that extends underneath a plurality of rings, in this example the four outer rings, of the feeder positions to receive a selection of solid substances from any one or a combination of the feeder units 21 in those feeder positions. The hopper inlet 33 tapers in a downward direction towards and debouches into the hopper outlet 34 to direct the collected solid substances towards the hopper outlet 34. Preferably, the hopper 31 is provided with one or more deflection elements *50* to deflect the solid substances in parts of the hopper inlet 31 and to optimize their respective falling trajectories through the hopper inlet 31. In this way, it can be prevented that some solid substance travel a longer trajectory than others, e.g. the solid substances received from an outer feeder position with respect to an inner or intermediate feeding position. In particular, the shapes of the one or more deflection elements are optimized to ensure that all solid substances, regardless of their feeder position origin, reach the hopper outlet 34 at substantially the same time. Preferably, the one or more deflection elements are removable from the hopper inlet 33 to facilitate easy cleaning and stacking of both the hopper inlet 33 and the one or more deflection elements.

Figure 7:
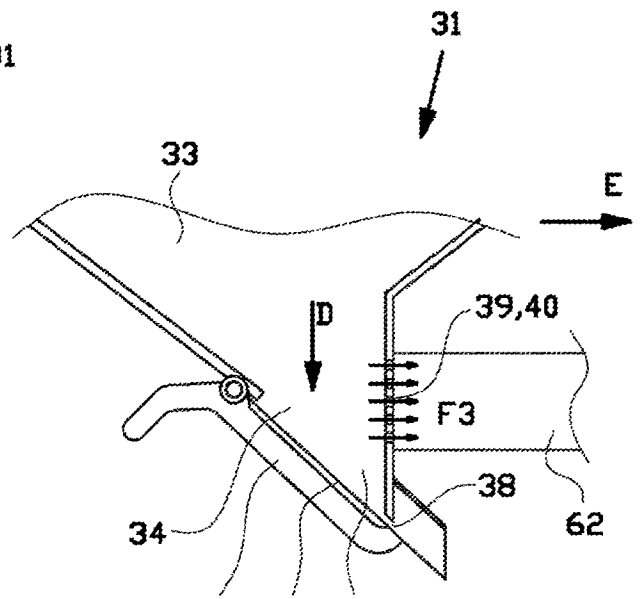
FIG. 7 shows a detail of the hoppers in cross section.

As shown in more detail in FIGS. 6 and 7, the hopper outlet 34 comprises an outlet channel 35 extending over an outlet height H in the dispensing direction D and terminating with an outlet opening 36 at the distal end thereof. The hopper 31 further comprises a dispensing shutter or valve 37 at the hopper outlet 34 that is movable between an open position and a closed position for opening and closing the outlet opening 36 of the hopper outlet 34. Preferably, the hopper 31 is provided with a retaining element (not shown) for retaining the dispensing valve 37 in the open position for cleaning purposes. A correction element (not shown) may be arranged in the way of the opened dispensing valve 37 at the outside of the second circular array B to automatically force the dispensing valve 37 into the closed position when the dispensing valve 37 has been left open unintentionally.

The outlet height H is dimensioned to buffer the solid substances in the outlet channel 35 while the dispensing valve 37 is closed. The outlet opening 36 is dimensioned to dispense all of the buffered solid substances simultaneously. At the bottom of the hopper outlet 34, at or near the outlet opening 36, the hopper 31 is provided with a small discharge opening 38 for discharge of small particles that are collected in the outlet channel 35 during the buffering of solid substances as a result of abrasion between said solid substances and the hopper 31. The discharge opening 38 is dimensioned to allow passage of said small particles, while blocking the larger solid substances. The hopper 31 is further provided with a suction opening 39 that is located above the discharge opening 38 in the dispensing direction D. The suction opening 39 is preferably provided with a grating 40 that prevents solid substances from entering the suction opening 39.

A typical apparatus 1 may comprise a few dozen (in this example seventy-two) hoppers 31. The hoppers 31 have to be taken out and inserted into the apparatus 1 regularly for cleaning and/or replacement. As shown in FIG. 6, the hoppers 31 are stackable to facilitate easy handling of the hoppers 31 outside of the apparatus 1. In particular, the hopper outlet 34 and at least the lower part of the hopper inlet 33 are dimensioned so as to fit into the hopper inlet 33 of an identical hopper 31. Each hopper 31 is further provided with a support rim or edge 41 extending on the outside of the hopper inlet 33. Once stacked onto another identical hopper 31, the support edge 41 of the one hopper 31 securely comes to rest on the upper edge of the hopper inlet 33 of the other hopper 31. To further stabilize the stacked hoppers 31 with respect to each other, each hopper 31 is provided with a grip 42 that not only facilitates easy manual handling of the hopper 31, but also features a hook 43 that is arranged to engage with a side edge or flange 44 of the hopper inlet 33 of another identical hopper 31.

The apparatus 1 is further provided with one or more sensors (not shown) to detect whether the hoppers 31 are correctly inserted into the second holder 32. In particular, the one or more sensors may be arranged on the outside of the second annular array B to detect any hoppers 31 protruding radially outwards from the correct position in the second annular array B.

As shown in FIG. 2, the collection section 3 is further provided with a cleaning device 6 for removing pollutants, such as dust and/or particles from the apparatus 1, and in particular from the hoppers 31. The cleaning device 6 comprises a hub 61 that is rotatable about the central axis S together with the second holder 32 and a plurality of pipes or ducts 62 for forming an air connection between each of the plurality of hoppers 31 and the hub 61. The hub 61 is arranged to be connected to a vacuum pump or a vacuum source 63 for generating a partial vacuum in the hub 61, which partial vacuum sucks or draws air from hoppers 31 through the respective ducts 62. As schematically shown in FIG. 7, each duct 62 is connected to the outlet channel 35 of a respective one of the hoppers 31 at a distance spaced apart from the outlet opening 36. In particular, the connection of the duct 62 to the hopper 31 is made above the discharge opening 38. The duct 62 is connected to the suction opening 39 of the hopper outlet 34 in a suction direction E transverse or perpendicular to the dispensing direction D. The grating 40 in the suction opening 39 allows the passage or communication of air and the pollutants into the duct 62, while blocking the solid substances from entering the duct 62.

Figure 5:
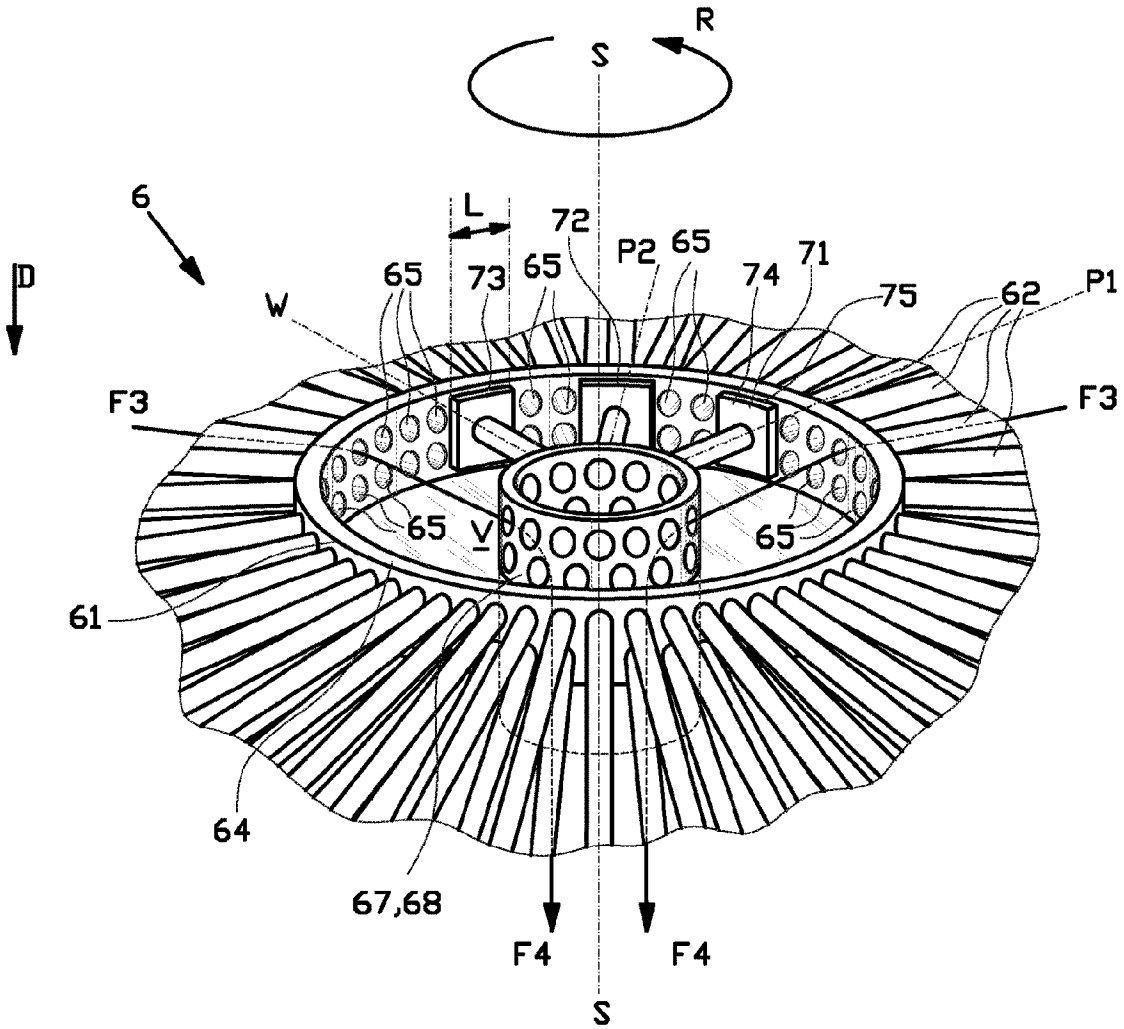
FIG. 5 shows a perspective view of a detail of a central area of the collection section.

As best seen in FIGS. 4 and 5, the hub 61 comprises a first circumferential wall 64 extending concentrically around the central axis S and defining a central volume V of the hub 61. The ducts 62 extend substantially radially away from the hub 61 towards their respective hoppers 31. The hub 61 is provided with a plurality of air openings 65 in and distributed circumferentially over or around the first circumferential wall 64. Each duct 62 is individually connected to and debouches into the hub 61 via one of said air openings 65. In this exemplary embodiment, because of the vast number of ducts 62, the air openings 65 are divided into a first group of air openings 65 and a second group of air openings 65 extending below the first group in a direction parallel to the central axis S. Considered in the circumferential direction about the central axis S, the ducts 62 alternately debouch into the hub 61 via one of the air openings 65 of the first group and one of the air openings 65 of the second group. A third or further groups may be provided to connect even more ducts 62 to the hub 61. The groups may be arranged vertically above each other or may be shifted with respect to each other in the circumferential direction of the hub 61.

As shown in FIG. 2, the cleaning device 6 further comprises a discharge conduit 66 for discharging the air that is collected in central volume V of the hub 61. The discharge conduit 66 is fixed and/or not rotatable with respect to the central axis S. Hence, to form an air connection between the rotatable hub 61 and the fixed discharge conduit 66, the cleaning device 6 is provided with an air-tight coupling 67. As shown in more detail in FIG. 5, the coupling 67 comprises a perforated second circumferential wall 68 extending concentrically inside the first circumferential wall 64 of the hub 61. Air collected in the central volume V of the hub 61 is drawn via the perforations in the second circumferential wall 68 into the discharge conduit 66 below.

The partial vacuum in the hub 61 draws air from the hoppers 31 via the respective ducts 62. The suction at the gratings 40, as shown in FIG. 7, unintentionally retains solid substances to the gratings 40 that should have fallen further down the outlet channel 35. Thus, said solid substances are not buffered properly and may not be dispensed to the dispensing section 5 upon opening of the dispensing valve 37. The solid substances may contaminate subsequent dispensing of solid substances, which is potentially hazardous, in particular in case of solid substances for medical use.

To solve the aforementioned drawback, the cleaning device 6 comprises a first blocking member 71, a second blocking member 72 and a third blocking member 73, as shown in FIGS. 4 and 5, for at least partially blocking air connections between some of the hoppers 31 and the hub 61. At least partially blocking the air connection may reduce the partial vacuum and allow solid substances that are stuck against the grating 40 of the hoppers 31 to fall further down the outlet channel 35. In particular, as best seen in FIG. 4, the first blocking member 71 is arranged for at least partially blocking one of the ducts 62 that is connected to one of the hoppers 31 that is located directly and/or vertically above the first packing position P1. Similarly, the second blocking member 72 is arranged for at least partially blocking one of the ducts 62 that is connected to one of the hoppers 31 that is located directly and/or vertically above the second packing position P2. Finally, the third blocking member 73 is arranged for at least partially blocking one of the ducts 62 that is connected to one of the hoppers 31 that is located directly and/or vertically above the waste position W. Consequently, any solid substances stuck against the gratings 40 of the hoppers 31 as a result of the partial vacuum, may yet be released after the respective duct 62 is disconnected or at least partially disconnected from the partial vacuum in the hub 61 and normal or atmospheric pressure is restored to said duct 62. As the blocking member 71, 72, 73 blocks the duct 62 while the dispensing valve 37 (see FIG. 7) of the hopper 31 is open, the released solid substances can still fall through the hopper outlet 34 and into the dispensing section 5. The packing positions P1, P2 and the waste position W may be arranged in a different order. Furthermore, additional packing positions or other functional positions may be provided.

In this exemplary embodiment, the blocking members 71, 72, 73 are fixed and/or not rotatable with respect to the central axis S. Consequently, rotating the hub 61 about the central axis S with respect to the blocking members 71, 72, 73 brings the blocking members 71, 72, 73 in front of other hoppers 31 which—in accordance with the rotation R—are then located in the respective positions P1, P2, W. In an alternative, yet significantly more complex embodiment, the blocking members may be arranged to block each duct 62 individually, e.g. by an individual, electronically controlled valve for each duct 62. Because of the simple arrangement, the blocking members 71, 72, 73 as shown in FIGS. 4 and 5 are preferred.

As can be observed in FIG. 4, the first blocking member 71 is located in a first blocking position that is radially aligned with the first packing position P1 with respect to the central axis S. Similarly, the second blocking member 72 is located in a second blocking position that is radially aligned with the second packing position P2 with respect to the central axis S. Finally, the third blocking member 73 is located in a third blocking position that is radially aligned with the waste position W with respect to the central axis S. Hence, a duct 62 extending radially between any of the blocking positions at the hub 61 and the respective packing positions P1, P2 or the waste position W can be blocked by the corresponding blocking member 71, 72, 73.

As best seen in FIG. 5, the blocking members 71, 72, 73 are each arranged for at least partially blocking one of the air openings 65 in the first circumferential wall 64. In particular, each blocking member 71, 72, 73 comprises a blocking body 74 that is arranged to extend at least partially in front of the air opening 65 of one of the ducts 62. The blocking body 74 comprises a blocking surface 75 that extends concentrically with respect to the first circumferential wall 64 to slide along the inside of the first circumferential wall 64 as said wall 64 rotates together with the second holder 2 about the central axis S. Preferably, the blocking surface 75 is placed as close as possible to and/or in abutment with the inside of the first circumferential wall 64 to prevent air from leaking past the blocking member 71, 72, 73 from the air openings 65.

As shown in FIGS. 4 and 5, the blocking surface 75 is arranged to extend along a circular arc with an arc length L that is sufficient to cover the air opening 65 of one duct 62 associated with the one hopper 31 that is currently in the packing position P1, P2 or the waste position W. Preferably, the blocking surface 75 is arranged to additionally cover the air openings 65 associated with one or more hoppers 31 that are located adjacently or consecutively upstream or downstream of the one hopper 31 and/or the respective position P1, P2, W in the rotational direction R. In particular, it has been found that is advantageous to already block the air openings 65 associated with one or more hoppers 31 upstream of the one hopper 31 and/or the respective position P1, P2, W in the rotation direction R to ensure that any solid substances stuck to the gratings 40 at said one or more hoppers 31 are already detached and/or have fallen further down the outlet channel 35 (see FIG. 7) prior to said one or more hoppers 31 reaching the packing position P1, P2 or the waste position W. Blocking an air opening 65 associated with one or more hoppers 31 downstream of the one hopper 31 and/or the respective position P1, P2, W may prevent that the partial vacuum is restored to early, for example while the dispensing valve 37 of the respective hopper 31 is still closing.

In this exemplary embodiment, the blocking surface 75 is arranged for blocking four air openings 65 simultaneously; two air openings 65 associated with hoppers 31 upstream of the one hopper 31 and/or the respective position P1, P2, W in the rotational direction R and one hopper 31 downstream of the one hopper 31 and/or the respective position P1, P2, W in the rotational direction R The blocking members 71, 72, 73 are spaced apart about the central axis S sufficiently so as to allow each duct 62 to form an unblocked air connection with the hub 61 in the spacing between the blocking members 71, 72, 73. Thus, between the first packing position P1, the second packing position P2 and the waste position W, air may be drawn from the respective hoppers 31 to remove pollutants.

The flow of air through the apparatus 1 will now be elucidated with reference to FIGS. 1, 2, 5 and 7.

As shown in FIGS. 1 and 2, the housing 10 comprises a first compartment 11 that encloses the feeder section 2, the collection section 3 and the dispensing section 5 and a second compartment 12 that encloses an adjacently located control section 9. At the first compartment 11, the housing 10 is provided with an air inlet 13 for drawing air into the feeder section 2, as schematically shown with airflow arrow F1. The apparatus 1 is preferably provided with a first filter 14 for filtering the incoming air flow F1. The first holder 22 forms a seal between the feeder section 2 and the collection section 3. Air from the feeder section 2 can pass along the feeder units 21 through the feeding holes 24 or through specially provided air holes (not shown) into the collection section 3 below, as shown schematically with airflow arrows F2. In particular, said holes debouch into the hoppers 31 of the collection section 3, such that most of the air flow F2 is directed into the hoppers 31. As previously discussed, a partial vacuum is generated in the internal volume V of the hub 61 to draw air from the hoppers 31 via the ducts 62, as schematically shown with air flow arrow F3. The air collected in the internal volume V of the hub 61 is subsequently drawn into discharge conduit 66 via the coupling 67, as schematically shown with airflow arrow F4, and passes through a second filter 69. The second filter 69 is arranged for filtering the pollutants from the air. Preferably, the second filter 69 is arranged for filtering dust and particles from medical solid substances from the air. Most preferably, the filter is a high-efficiency particulate air filter or HEPA filter. The clean air is subsequently fed into the second compartment 12 to cool any control units 91, 92 in the control section 9, as schematically shown with airflow arrow F5.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

In summary, the invention relates to an apparatus 1 and a method for dispensing solid substances, wherein the apparatus 1 comprises a feeder section 2 with a plurality of feeder units 21, a collection section 3 with a plurality of hoppers 31 and a dispensing section 5, wherein the plurality of hoppers 31 are rotatable with respect to the feeder units 21 and a first packing position P1 for dispensing the solid substances to the dispensing section 5, wherein the apparatus 1 comprises a cleaning device 6 for removing pollutants from the hoppers 31, wherein the cleaning device 6 comprises a hub 61 and a plurality of ducts 62 forming air connections between the plurality of hoppers 31 and the hub 61, wherein the cleaning device 6 comprises a first blocking member 71 that is arranged for blocking the air connection between one of the hoppers 31 and the hub 61 when said one hopper 31 is positioned in the first packing position P1.

The invention claimed is:

1. An apparatus for dispensing solid substances, wherein the apparatus comprises a feeder section with a first holder for holding a plurality of feeder units in a first circular array that extends concentrically around an upright central axis, a collection section with a second holder for holding a plurality of hoppers in a second circular array that extends concentrically around the central axis below the first holder, and a dispensing section below the second holder, wherein the second holder is rotatable about the central axis for rotating the plurality of hoppers with respect to the feeder positions for receiving solid substances from one or more of the feeder units and with respect to a first packing position for dispensing the solid substances to the dispensing section, wherein the apparatus further comprises a cleaning device for removing pollutants from the plurality of hoppers, wherein the cleaning device comprises a hub that is rotatable about the central axis together with the second holder and a plurality of ducts for forming an air connection between each of the plurality of hoppers and the hub, wherein the hub is arranged to be connected to a vacuum source for generating a partial vacuum in the hub, wherein the cleaning device comprises a first blocking member that is arranged for at least partially blocking the air connection between one of the hoppers and the hub when said one hopper is positioned in the first packing position.

2. An apparatus according to claim 1, wherein the first blocking member is arranged for at least partially blocking the one duct that forms the air connection between the one hopper and the hub.

3. An apparatus according to claim 1, wherein the hub comprises a circumferential wall extending concentrically around the central axis, wherein the ducts debouch into the hub via a plurality of air openings in the circumferential wall, wherein the first blocking member is arranged for at least partially blocking the one duct at the air opening of said one duct in the circumferential wall.

4. An apparatus according to claim 3, wherein the air openings are distributed over the circumferential wall of the hub about the central axis.

5. An apparatus according to claim 3, wherein the plurality of air openings comprises a first group of air openings and a second group of air openings extending below the first group of air openings in a direction parallel to the central axis, wherein the ducts alternately debouch into the hub via one of the air openings of the first group and one of the air openings of the second group.

6. An apparatus according to claim 3, wherein the first blocking member is located in a first blocking position that is fixed relative to the first packing position.

7. An apparatus according to claim 6, wherein the first blocking position is radially aligned with the first packing position with respect to the central axis.

8. An apparatus according to claim 3, wherein the first blocking member comprises a blocking body that is arranged to extend at least partially in front of the air opening of the one duct in the circumferential wall.

9. An apparatus according to claim 8, wherein the blocking body comprises a blocking surface that extends concentrically with respect to the circumferential wall along an circular arc with an arc length that is arranged to cover the air opening of at least the one duct.

10. An apparatus according to claim 9, wherein the second holder is arranged to be rotated about the central axis in a rotational direction, wherein the arc length is arranged to cover the air opening of the one duct and the air opening of a duct that connects to an adjacent hopper directly upstream or downstream in the rotational direction of the one hopper.

11. An apparatus according to claim 10, wherein the arc length is arranged to cover the air openings of two ducts that connect to two adjacent hoppers directly upstream or downstream in the rotational direction of the one hopper.

12. An apparatus according to claim 8, wherein the blocking surface is arranged to abut the circumferential wall, wherein the circumferential wall is arranged to slide along the blocking surface when hub rotates together with the second holder about the central axis.

13. An apparatus according to claim 1, wherein the dispensing section comprises a second packing position, wherein the cleaning device comprises a second blocking member that is arranged for at least partially blocking the air connection between one of the hoppers and the hub when said one hopper is positioned in the second packing position.

14. An apparatus according to claim 1, wherein the dispensing section comprises a waste position, wherein the cleaning device comprises a third blocking member that is arranged for at least partially blocking the air connection between one of the hoppers and the hub when said one hopper is positioned in the waste position.

15. An apparatus according to claim 13, wherein the blocking members are spaced apart about the central axis sufficiently so as to allow each duct to form an unblocked air connection with the hub in the spacing between the blocking members.

16. An apparatus according to claim 1, wherein the cleaning device further comprises a discharge conduit that is fixed relative to the central axis and a coupling for forming an air connection between the fixed discharge conduit and the rotatable hub, wherein the discharge conduit is arranged for discharging air from the hub.

17. An apparatus according to claim 16, the apparatus further comprises a control section with a control unit for controlling the operation of the apparatus, wherein the discharge conduit is connected to the control section for cooling the control unit with the discharged air from the discharge conduit.

18. An apparatus according to claim 16, wherein the cleaning device comprises a filter in the discharge conduit for filtering the pollutants from the discharged air.

19. An apparatus according to claim 1, wherein the air connections are airtight.

20. An apparatus according to claim 1, wherein the feeder section comprises a housing and an air inlet in the housing, wherein the housing is airtight apart from the air inlet, wherein the ducts are in air communication with the housing via the plurality of hoppers, wherein the cleaning device is arranged for drawing air into the housing via the air inlet.

21. An apparatus according to claim 20, wherein the apparatus comprises a filter in the air inlet for filtering the drawn air.

22. An apparatus according to claim 20, wherein the air inlet is placed in air communication with the feeder section.

23. An apparatus according to claim 1, wherein each hopper comprises a hopper inlet for receiving the solid substances from one or more of the feeder units and a hopper outlet for dispensing the solid substances to the dispensing section in a downward dispensing direction, wherein the hopper inlet tapers towards and debouches into the hopper outlet, wherein each of the ducts is connected to a respective one of the hoppers at said hopper outlet in a suction direction transverse or perpendicular to the dispensing direction.

24. An apparatus according to claim 23, wherein the hopper outlet comprises an outlet channel extending over an outlet height in the dispensing direction and terminating with an outlet opening at the distal end thereof, wherein the each of the ducts is connected to the outlet channel of a respective one of the hoppers at a distance spaced apart from the outlet opening.

25. An apparatus according to claim 23, wherein each hopper or each duct is provided with a grating that extends between the duct and the respective hopper for allowing air communication between the hopper and the duct while blocking solid substances from entering the duct.

26. An apparatus according to claim 23, wherein each hopper comprises a dispensing valve that is movable between an open position and a closed position for opening and closing the hopper outlet, respectively, wherein the first blocking member is arranged for at least partially blocking the air connection between the hopper and the hub when the dispensing valve of the hopper is open.

27. A method for dispensing solid substances with the use of the apparatus according to claim 1, wherein the method comprises the steps of removing pollutants from the plurality of hoppers with the use of the partial vacuum provided by the cleaning device and using the first blocking member to at least partially block the air connection between one of the hoppers and the hub when said one hopper is positioned in the first packing position.

28. A method according to claim 27, wherein the dispensing section comprises a second packing position, wherein the method further comprises the step of using a second blocking member to at least partially block the air connection between one of the hoppers and the hub when said one hopper is positioned in the second packing position.

29. A method according to claim 27, wherein the dispensing section comprises a waste position, wherein the method further comprises the step of using a third blocking member to at least partially block the air connection between one of the hoppers and the hub when said one hopper is positioned in the waste position.

30. A method according to claim 27, wherein the apparatus comprises a control section with one or more control units, wherein the method further comprises the step of discharging air with the pollutants from the hub, filtering the pollutants from the air and using said filtered air to cool the one or more control units.

*31. A hopper for receiving solid substances from a plurality of feeder units in a row located at outer feeder positions and inner feeder positions, the hopper comprising:*

*a hopper inlet for a receiving solid substances, the hopper inlet extending along a length under the plurality of feeder units in the row to receive the solid substances from each of the plurality of feeder units, wherein the plurality of feeder units extend along substantially the entire length of the hopper inlet;*

*a hopper outlet at a lower end of the hopper and at a center point along the length of the hopper inlet;*

*one or more walls converging between the hopper inlet and the hopper outlet; and*

*a deflection element located in the hopper between the inlet and the outlet to deflect the solid substances dropping from inner feeder positions through the hopper inlet to prevent that solid substances travel a longer falling trajectory through the hopper inlet from outer feeder positions than solid substances travelling from inner feeder positions.*

*32. The hopper of claim 31, and further comprising a dispensing valve to selectively cover the hopper outlet.*

*33. The hopper of claim 31, wherein the one or more walls comprise first and second major opposing surfaces which converge between the hopper inlet and the hopper outlet.*

*34. The hopper of claim 31, wherein the deflection element is removable.*

*35. The hopper of claim 31, and further comprising a discharge opening.*

*36. The hopper of claim 35, wherein the discharge opening is located at or near the hopper outlet.*

*37. The hopper of claim 35, wherein the discharge opening is dimensioned to allow passage of particles smaller than the solid substances while blocking the solid substances.*

*38. The hopper of claim 31, and further comprising a suction opening.*

*39. The hopper of claim 38, wherein the suction opening comprises a grating.*

*40. The hopper of claim 31, and further comprising an outlet channel dimensioned to buffer the solid substances when the hopper outlet is not open for dispensing.*

*41. The hopper of claim 31, wherein the hopper inlet is substantially rectangular.*

*42. The hopper of claim 31, wherein in the hopper is dimensioned to be stackable with a second hopper.*

*43. The hopper of claim 42, and further comprising a support edge extending on an outside of the hopper, dimensioned and positioned to contact a second hopper when in a stacking arrangement.*

*44. The hopper of claim 31, and further comprising a grip.*

*45. The hopper of claim 44, wherein the grip comprises a hook and a flange arranged to engage with a respective hook or flange of a grip on a second hopper in a stacking arrangement.*

*46. A stackable hopper comprising:*

*an inlet at a top portion of the hopper;*

*an outlet at a lower end of the hopper;*

*one or more walls converging from the inlet to the outlet;*

*a stacking edge on an outside of at least one of the one or more walls to support a stacking arrangement of the hopper with an identical hopper; and*

*a grip comprising a hook and a flange arranged to engage with a respective hook or flange of a grip on a second hopper in a stacking arrangement.*

*47. The stackable hopper of claim 46, wherein the one or more walls comprises:*

*first and second opposing major side walls converging together; and*

*first and second end walls which extend toward each other from the inlet to the outlet.*

*48. The stackable hopper of claim 47, wherein the stacking edge is located on at least one of the first and second opposing major side walls.*

* * * * *